(12) United States Patent
Narayan-Sarathy et al.

(10) Patent No.: US 7,291,658 B2
(45) Date of Patent: Nov. 6, 2007

(54) RADIATION-CURABLE INKS FOR FLEXOGRAPHIC AND SCREEN-PRINTING APPLICATIONS FROM MULTIFUNCTIONAL ACRYLATE OLIGOMERS

(75) Inventors: Sridevi Narayan-Sarathy, Dublin, OH (US); Lisa M. Hahn, Delaware, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 284 days.

(21) Appl. No.: 10/682,874

(22) Filed: Oct. 14, 2003

(65) Prior Publication Data

US 2005/0080162 A1    Apr. 14, 2005

(51) Int. Cl.
*C08F 2/46* (2006.01)
*C08F 8/30* (2006.01)
*C08G 18/67* (2006.01)
*C08J 3/00* (2006.01)
*C08K 3/20* (2006.01)

(52) U.S. Cl. .............. 523/160; 101/34; 101/128.1; 101/211; 270/1.01; 427/150; 428/500; 522/90; 522/100; 522/104; 522/173; 522/178; 523/161; 524/555; 524/558; 524/612

(58) Field of Classification Search ........ 523/160, 523/161; 101/491, 34, 128.1, 281; 270/1.01; 401/40, 20, 21, 16; 427/150; 522/90, 100, 522/104, 173, 178; 428/500
See application file for complete search history.

(56) References Cited

U.S. PATENT DOCUMENTS

| 4,457,766 | A | * | 7/1984 | Caul ..................... 51/298 |
|---|---|---|---|---|
| 5,496,896 | A | * | 3/1996 | Alfons ................... 525/74 |
| 5,554,705 | A | * | 9/1996 | Cleary et al. .......... 526/318.44 |
| 5,733,971 | A | * | 3/1998 | Feldmann-Krane et al. 524/837 |
| 5,821,276 | A | * | 10/1998 | Duncan ................. 522/182 |
| 6,025,410 | A | * | 2/2000 | Moy et al. .............. 522/182 |
| 6,211,262 | B1 | * | 4/2001 | Mejiritski et al. ........ 522/71 |
| 6,300,388 | B1 | * | 10/2001 | Verdonck et al. ......... 522/173 |
| 6,461,419 | B1 | * | 10/2002 | Wu et al. ............... 106/31.6 |
| 6,467,897 | B1 | * | 10/2002 | Wu et al. ............... 347/102 |
| 6,673,851 | B2 | * | 1/2004 | Moy et al. .............. 522/173 |
| 6,806,301 | B2 | * | 10/2004 | Latunski et al. ......... 523/160 |
| 6,924,324 | B2 | * | 8/2005 | Gaudl et al. ............ 522/182 |
| 2004/0235977 | A1 | * | 11/2004 | Bulluck et al. ......... 522/71 |
| 2005/0027082 | A1 | * | 2/2005 | Narayan-Sarathy et al. 525/471 |
| 2005/0080152 | A1 | * | 4/2005 | Bergiers et al. ......... 522/71 |

* cited by examiner

*Primary Examiner*—Patrick Niland
(74) *Attorney, Agent, or Firm*—Connolly Bove Lodge & Hutz, LLP (57) ABSTRACT

The present invention relates generally to radiation-curable ink formulations, and particularly, but not by way of limitation, to a family of radiation-curable ink formulations specifically for flexographic and screen printing applications. The inventive ink formulations are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions.

36 Claims, 2 Drawing Sheets

FIGURE 1.

PEG 600 diacetoacetate (n = ~ 3-4)

TMPTA

Strong base catalyst

FIGURE 2

RADIATION-CURABLE INKS FOR FLEXOGRAPHIC AND SCREEN-PRINTING APPLICATIONS FROM MULTIFUNCTIONAL ACRYLATE OLIGOMERS

FIELD OF THE INVENTION

The present invention relates generally to radiation-curable ink formulations, and particularly, but not by way of limitation, to a family of radiation-curable ink formulations specifically for screen printing applications. Moreover, the present invention relates particularly, but not by way of limitation, to a family of radiation-curable ink formulations specifically for flexographic printing applications. The inventive ink formulations are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions.

BACKGROUND

The information provided below is not admitted to be prior art to the present invention, but is provided solely to assist the understanding of the reader.

Screen printing is considered to be one of the major printing processes due to the versatile nature of the process, economy of short run work and the relatively low capital investment required to start a screen printing process. Solvent-based evaporation drying ink systems are still the most widely used technology in screen printing, but increased emphasis on environmental considerations has been a driving force in advancing the utilization of UV technology in screen printing. Advances in raw material technology have made it possible to formulate screen inks which can UV cure at commercial line speeds to give prints with good opacity, durability and chemical resistance. It is important to use a substantial amount of a mixture of different photo initiators to ensure surface and through cure in a thick film application such as screen printing. Traditional photo-initiators (e.g., benzophenone) can be toxic, expensive, and malodorous. An additional drawback to traditional photo-initiators is their tendency to contribute to film color, which can limit their applicability to white and light-colored inks.

In recent years, UV flexographic inks have developed to become a serious alternative to offset or letterpress printing inks as well as to solvent and water-based flexographic inks. Environmental concerns mitigating the use of volatile solvents, financial considerations, and the availability of alternative technologies, have combined to persuade printers to consider UV flexographic printing as a viable low cost option. Advances in raw material technology have made it possible to formulate flexo inks which have the high pigment loadings and good flow characteristics that are needed in the ink fountain, to enable the ink to transfer cleanly from the anilox roll, as well as to print with high color density from fine line aniloxes. In addition, better flow properties lead to a better printed appearance, as the ink will level more completely and yield good gloss. The flexographic inks of the present invention can UV-cure at commercial line speeds to give prints with good opacity, durability, and chemical resistance. Current commercial UV-cure flexo inks require the use of substantial quantities of a mixture of different photo initiators to ensure optimum cure and to obtain proper adhesion in thin film applications under the various conditions applicable to flexographic printing. Traditional photo initiators (e.g., benzophenone) are undesirable because they can be toxic, expensive, and malodorous. Moreover, their use can contribute to film color, which can limit applicability in white and light-colored inks.

Acrylate, methacrylate and other unsaturated monomers are widely used in coatings, adhesives, sealants, and elastomers, and may be crosslinked by ultraviolet light in the presence of photoinitiators or by peroxide-initiated free radical cure. These photoinitiators and/or peroxides are typically low molecular weight multifunctional compounds that may be volatile or readily absorbed through skin and can cause adverse health effects. Functionalized oligomeric photoinitiators may overcome some of these drawbacks; generally, polymeric photoinitiators are nonvolatile compounds, not readily absorbed through skin. However, multistep syntheses may be required, low functionality may be detrimental to reactivity and final properties, and catalyst or initiator may still be required to affect crosslinking.

Figure 1:
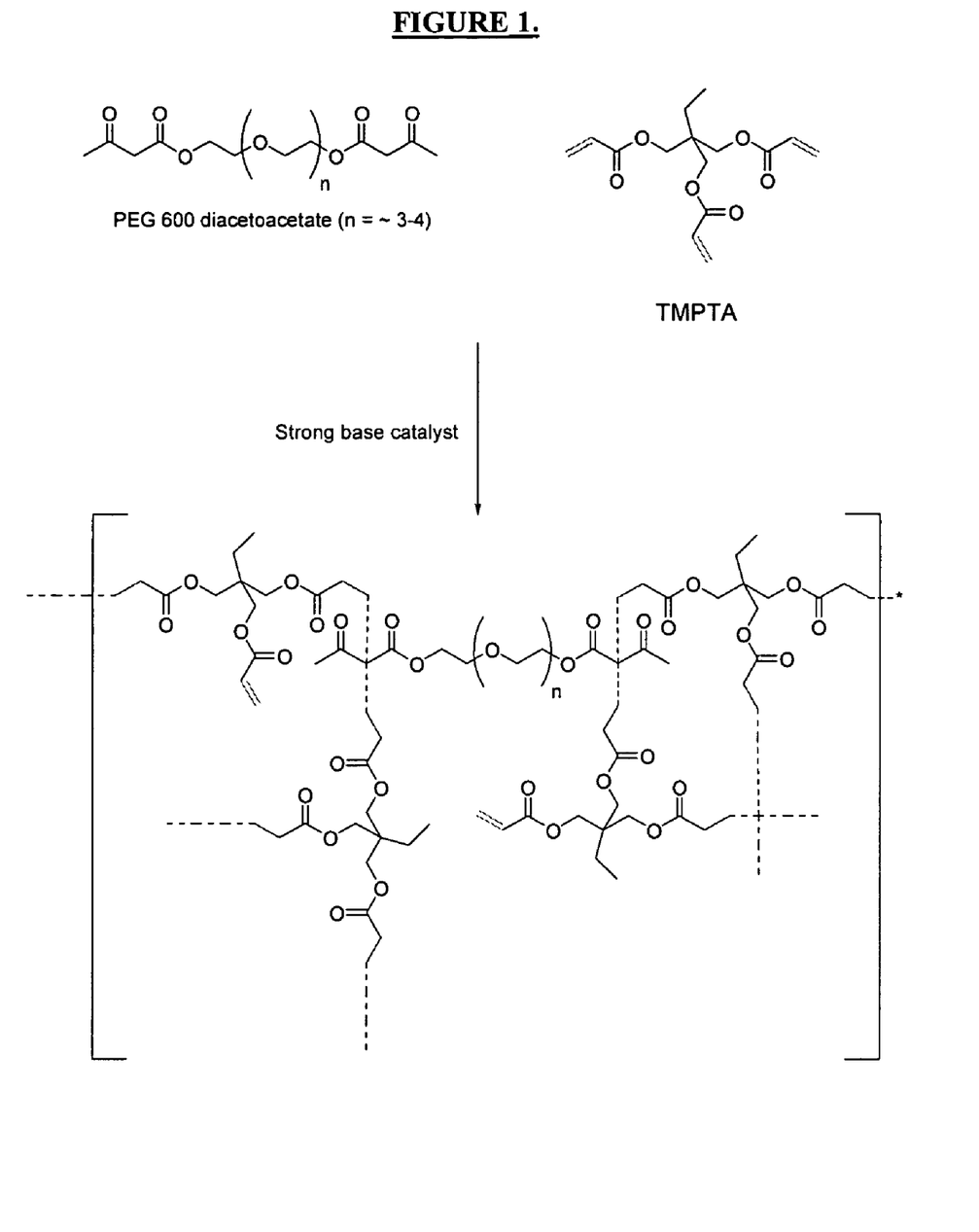
FIG. 1 is a schematic synthesis of a general Michael oligomer.

The Michael addition of acetoacetate donor compounds to multiacrylate receptor compounds to make crosslinked polymers has been described in the literature. For example, Mozner and Rheinberger reported the Michael addition of acetoacetates to triacrylates and tetracrylates. (16 Macromolecular Rapid Communications 135 (1995)). The products formed were crosslinked gels. In one such reaction, depicted in FIG. 1, Mozner added one mole of trimethylol propane triacrylate (TMPTA) having 3 functional groups to one mole of polyethylene glycol (600 molecular weight) diacetoacetate (PEG600-DAA) having two functional groups. (Each acetoacetate "functional group" reacts twice, thus each mole of diacetoacetate has four reactive equivalents.) The resulting network is considered "gelled", or cured, despite the presence of unreacted acrylic functional groups. While further reaction can be promoted, this network cannot be made liquid either with heat or solvent because it is essentially crosslinked.

U.S. Pat. Nos. 5,945,489 and 6,025,410, to Moy et al. and assigned to the assignee of the present invention, disclose that certain soluble liquid uncrosslinked oligomers, made by one step Michael addition of β-dicarbonyl donor compounds (e.g., acetoacetates) to multifunctional acrylates, can be further crosslinked using ultraviolet light without requiring costly photoinitiators. Moreover, when precise proportions of multiacrylate acceptor compounds to β-dicarbonyl donor compounds are combined in the presence of a basic catalyst, liquid oligomeric compositions result. If proportions below the ranges disclosed in the above-cited patent documents are used, crosslinked gels or solid products are made. In addition, the disclosed liquid oligomer compositions can readily be applied to various substrates using conventional coating techniques such as roll or spray prior to ultraviolet light cure.

The amount of external photoinitiator in ink formulations can be significantly reduced by using the acrylate oligomer technology described in patents U.S. Pat. No. 5,945,489 and U.S. Pat. No. 6,025,410 (both Ashland, Inc.). The invention disclosed here demonstrates the advantageous use of these uncrosslinked resins alone or modified by reaction/blending with additional materials in ink formulations for flexo and screen-printing applications. These additional materials include a variety of acrylic monomers and oligomers; vinyl monomers, such as N-vinyl caprolactam and vinyl ethers; primary, secondary, and tertiary amines; acid-functional materials; siloxanes; elastomers; waxes; and other materials to modify and improve printing performance and pigments to impart color to inks.

Screen-printing ink formulations comprised of traditional monomers and oligomers often have compatibility issues with some of the above additives. Therefore, the designer of traditional screen-printing inks has fewer formulation options. However, formulations built from the novel photocurable oligomer resins described herein can incorporate a nearly unlimited variety of additives due to the chemical/architectural control possible in their synthesis. Thus, many more options are available to the formulator who must address specific challenges (e.g., adhesion, flexibility, etc.) for each particular substrate.

Flexo and Screen-printing inks based on the resins described above can be cured by all methods typically used to crosslink acrylic materials. Cure, or crosslinking, is usually accomplished through a free radical chain mechanism, which may require any of a number of free radical-generating species such as peroxides, hydroperoxides, REDOX combinations, and other materials that decompose to form radicals either when heated, or at ambient temperature in the presence of a promoter such as an amine or a transition metal. Free radicals are also generated by the decomposition of a photo-initiator under the influence of ultraviolet (UV) or electron beam (EB) radiation.

Flexo and Screen-printing inks based on the novel acrylate oligomers described in this invention offer significant advantages over inks based on traditional multifunctional acrylic monomers and oligomers in that they can be cured by exposure to UV radiation with a fraction of the photo-initiator required for standard UV-cure inks. Under typical UV curing conditions (~300–600 mJ/cm$^2$), these inks can be effectively cured on a variety of substrates with substantially less photo-initiator.

Other objects and advantages will become apparent from the following disclosure.

SUMMARY OF INVENTION

The present invention provides a family of radiation-curable ink formulations specifically for screen printing and flexographic printing applications. An aspect of the present invention provides ink formulations based on multifunctional acrylate resins formed by the reaction of acrylate monomers and oligomers with β-dicarbonyl compounds such as β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions.

An aspect of the present invention provides ink formulations that will cure (cross-link) under standard UV-cure conditions with significantly less photo-initiator than is required by traditional formulations. A further aspect provides dual-functional inks derived from multi-functional polyacrylate oligomers. The inks of the present invention are dual-functional, because they possess both an acrylic functionality and a labile ketone that, upon irradiation with UV light, dissociate to form a free radical.

An aspect of the present invention provides inks, in particular, flexo and screen-printing inks that may suitably incorporate other materials to enhance properties desired in the inks. Suitable property-enhancing inclusion materials may include reactive (conventional acrylates) and non-reactive (e.g., solvents) components that may also be incorporated into the formulation to enhance the performance properties of the ink such as adhesion to various substrates, gloss, or solvent resistance. These materials include a variety of acrylic monomers and oligomers, vinyl monomers, such as N-vinyl-caprolactam and vinyl ethers; primary, secondary and tertiary amines, acid-functional monomers and oligomers, silicones, waxes and elastomers, and other materials.

An aspect of the present invention provides multifunctional acrylate screen let-down resins that adapt the rheology, color, and adhesion characteristics of various pigment dispersions to the substrates and devices encountered in screen printing applications.

An aspect of the present invention provides multifunctional acrylate flexo let-down resins that adapt the rheology, color, and adhesion characteristics of various pigment dispersions to the substrates and devices encountered in flexo printing applications.

An aspect of the present invention provides a UV-cured screen ink having excellent gloss and adhesion properties.

An aspect of the present invention provides a UV-cured flexo ink having excellent gloss and adhesion properties.

An aspect of the present invention provides inks that may be cured via chemical or thermal means, or by exposure to UV or electron beam radiation.

An aspect of the present invention provides ink formulations that exhibit performance properties that make them very effective across a range of substrates. According to a further aspect, these properties can be greatly modified as a function of varying oligomer composition and other ingredients of the final coating formulation. According to a further aspect, means are provided for more economical ink formulations that allow for varying properties without requiring blending with additives, as is done in traditional UV ink systems. According to yet a further aspect, the inks of the present invention exhibit a wide range of gloss, rheological performance, flexibility, stain resistance, scratch resistance, weather resistance, solvent resistance, as well as other desirable properties. Almost any desired ink performance parameter can be attained by proper selection of the raw material building blocks used to make the oligomers that form the basis of the ink formulation.

According to an aspect of the present invention, final ink properties can be modified by a plurality of means including the use of additional or supplementary acrylate materials, the use of various β-dicarbonyl compounds, or by simple variation of the stoichiometry of the reactants comprising the oligomer.

According to an aspect, the present invention provides Michael screen let-down resins comprising: a multifunctional acrylate, a β-dicarbonyl compound, and/or an amine.

According to an aspect, the present invention provides Michael flexo let-down resins comprising: a multifunctional acrylate, a β-dicarbonyl compound, and/or an amine.

According to an aspect, the present invention provides a UV-curable screen-ink formulation comprising, on a parts by weight basis: from about 10 parts to about 60 parts of a pigment dispersion, from about 30 parts to about 75 parts of a Michael screen let-down resin, up to 30 parts of a reactive diluent monomer, up to about 10 parts of an adhesion promoting monomer, up to about 2 part of a reactive defoaming additive, up to about 2 parts of a silicone defoamer; and up to about 10 parts of a photoinitiator.

According to an aspect, the present invention provides a UV-curable flexo-ink formulation comprising, on a parts by weight basis: from about 10 parts to about 60 parts of a pigment dispersion, from about 30 parts to about 75 parts of a Michael flexo let-down resin, up to 30 parts of a reactive diluent monomer, up to about 10 parts of an adhesion promoting monomer, up to about 2 part of a reactive defoaming additive, up to about 2 parts of a silicone defoamer; and up to about 10 parts of a photoinitiator.

According to an aspect, the present invention provides a method of manufacturing a UV-curable screen-ink formulation, comprising: mixing from about 5 parts to about 70 parts of a pigment dispersion, from about 10 parts to about 90 parts of a screen let-down resin, mixing thereto up to about 10 parts of an adhesion promoting monomer, mixing thereto up to 30 parts of a reactive diluent monomer, mixing thereto up to about 1 part of a reactive defoaming additive, mixing thereto up to about 2 parts of a silicone defoamer, and mixing thereto up to about 10 parts of a photoinitiator, wherein all parts are by weight.

According to an aspect, the present invention provides a method of manufacturing a UV-curable flexo-ink formulation, comprising: mixing from about 5 parts to about 70 parts of a pigment dispersion, from about 10 parts to about 90 parts of a flexo let-down resin, mixing thereto up to about 10 parts of an adhesion promoting monomer, mixing thereto up to 30 parts of a reactive diluent monomer, mixing thereto up to about 1 part of a reactive defoaming additive, mixing thereto up to about 2 parts of a silicone defoamer, and mixing thereto up to about 10 parts of a photoinitiator, wherein all parts are by weight.

According to an aspect, the present invention provides a method of screen-printing a substrate using a UV-curable screen-ink formulation, comprising: providing a screen-assembly comprising a frame, a mesh, and an appropriately-patterned mask; providing the inventive UV-curable screen-ink formulation to the assembly; providing a substrate to be printed; aligning the assembly on the substrate; contacting the substrate with the ink by forcing the ink through the mesh; and curing the ink on the substrate.

According to an aspect, the present invention provides a flexographic method of printing a substrate using a UV-curable flexo-ink formulation, comprising: providing the inventive UV-curable flexo-ink formulation to an anilox roll; transferring the inventive UV curable flexo ink formulation to a printing plate; applying the inventive flexo ink to a substrate using the roll; and curing the ink on the substrate.

According to further aspects of the present invention substrates and surfaces printed with the inventive inks are provided.

BRIEF DESCRIPTION OF DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

It is to be noted, however, that the appended drawings are illustrative only and do not limit the scope of the invention.

DETAILED DESCRIPTION OF A PREFERRED EMBODIMENT

Reference is made to the figures to illustrate selected embodiments and preferred modes of carrying out the invention. It is to be understood that the invention is not hereby limited to those aspects depicted in the figures.

Ultraviolet light photopolymerization of the inventive inks was demonstrated by applying a portion of the inventive composition to a surface. The screen inks were printed on to the surface using a suitable, pre-stretched polyester or nylon mesh and a hand-held squeegee to a thickness of about 1 mil. The flexographic inks were printed on to the surface using a hand-proofer containing a suitable anilox roll, to a thickness of about 2-10 microns. Specimens were cured with a Fusion Systems Corp. UV curing unit using a 600-watt H-bulb and a belt-speed of up to 140 feet/minute.

The inks of the present invention comprise three main components: a resin-based pigment dispersion, a let-down resin, and a set of accessory components. A preferred pigment dispersion is based on Michael dispersion resins disclosed in co-pending application (Ser. No. not yet assigned; Attorney Docket Number 20435/151), the entire contents of which is hereby incorporated by reference for all purposes.

The set of accessory components includes substances chosen to adapt the rheology of pigment dispersions to the substrates on which the inks are printed and to the various devices used in the printing processes. The set of accessory components comprises: photo-initiators, monomers chosen to promote adhesion to the substrate, leveling agents, and de-foaming agents.

The various inks of the present invention are distinguished by the Michael let-down resin use in their formulation.

As detailed in the examples below, the screen inks of the present invention were applied to a variety of substrates using a suitable screen mesh mounted to give a defined clearance and a hand-held squeegee. A pre-stretched aluminum frame of size 20×24 inch was used with a mesh count of 305. A 70-durometer aluminum squeegee was used to screen print on to various substrates. Cure was accomplished by exposure to a single 600 W Fusion "H" bulb at the specified dose.

In the examples relating to flexo inks, the inks were applied to a variety of substrates by using a Pamarco spring-loaded flexographic proofer. The Pamarco proofer possesses a 360P 44 anilox, which has a carrying capacity of 5.0 bcm (billion cubic microns). Cure was accomplished by exposure to a single 600 W Fusion "H" bulb at the specified dose.

Ink performance properties were measured by a variety of different test methods. For purposes of defining properties of the inventive inks, test methods familiar to those skilled in the art were utilized.

Gloss was measured using a BYK Gardner™ model 4520 micro-TRI-gloss meter (BYK-Gardner USA, Columbia, Md.) with a coated substrate placed on black felt. The light source was placed at a 60° angle. The test is based on ASTM D523-89.

The viscosity of various ink formulations was measured as cone and plate viscosity at 25° C. using a Brookfield® CAP 2000L viscometer.

As is known in the art, tack-free cure is a qualitative assessment of film surface cure that requires no stickiness or "greasiness" to the touch of an ungloved finger or palm and no tack with the finger of a latex glove. Herein, tack is assessed by rubbing a cotton swab over the cured surface.

Adhesion of the inventive inks to substrates was measured according to the crosshatch method of ASTM 2359. The test reports values OB to 5B; OB being a total failure and 5B comprises excellent adhesion.

Let-Down Resins and Inks for Screen-Printing Applications.

The following examples illustrate the constitution, application, cure, and performance properties of ink formulations detailed in this disclosure. In comparative formulations 1-4, "benchmark" formulations based on commercially available materials were chosen as comparative standards. The formulations are comprised of commercial raw materials, in parts by weight, as specified in Tables I-IV. ViaScreen® (UCB Chemicals) vehicles are a mixture of monomers and oligomers that have been optimized for screen-printing applications. Similarly, ViaCure® (UCB Chemicals) vehicles are a mixture of photo initiators optimized for the various color ink formulations.

TABLE I

Standard White Screen-Ink Formulation Screen UCB-w-O52803-05.

| Raw Material | Description | Parts (w/w) |
| --- | --- | --- |
| Pigment | R-706 | 41.2 |
| ViaScreen 515 | UCB vehicle for screen-printing applications | 30.1 |
| Ebecryl 110 | 2-Phenoxyethyl acrylate | 18.8 |
| Ebecryl P115 | Amino acrylate | 7.21 |
| LG-37 | Reactive defoaming additive | 1.0 |
| BYK 019 | Silicone defoamer | 0.5 |
| ViaCure LX | UCB photoinitiator vehicle for ink applications | 6 |

TABLE II

Standard Yellow Screen-Ink Formulation Screen UCB-y-052803-04.

| Raw Material | Description | Parts (w/w) |
| --- | --- | --- |
| Pigment | YE 1400 DC | 4 |
| ViaScreen 515 | UCB vehicle for screen-printing applications | 55.3 |
| Ebecryl 110 | 2-Phenoxyethyl acrylate | 28.6 |
| Ebecryl P115 | Amino acrylate | 7 |
| LG-37 | Reactive defoaming additive | 1.0 |
| BYK 019 | Silicone defoamer | 0.5 |
| ViaCure-DX | UCB photoinitiator vehicle for ink applications | 4 |

TABLE III

Standard Red Screen-ink Formulation (Screen UCB-R-052803-01).

| Raw Material | Description | Parts (w/w) |
| --- | --- | --- |
| Pigment | LR-1392 | 5.05 |
| ViaScreen 515 | UCB vehicle for screen-printing applications | 53.5 |
| Ebecryl 110 | 2-Phenoxyethyl acrylate | 27.8 |
| Ebecryl P115 | Amino acrylate | 8.1 |
| LG-37 | Reactive defoaming additive | 1.0 |
| BYK 019 | Silicone defoamer | 0.5 |
| ViaCure-DX | UCB photoinitiator vehicle for ink applications | 5 |

TABLE IV

Standard Blue Screen-ink Formulation (Screen UCB-b-052003-05).

| Raw Material | Description | Parts (w/w) |
| --- | --- | --- |
| Pigment | BL-1531 | 4.1 |
| ViaScreen 515 | UCB vehicle for screen-printing applications | 54.3 |
| Ebecryl 110 | 2-Phenoxyethyl acrylate | 29.2 |
| Ebecryl P115 | Amino acrylate | 8.2 |
| LG-37 | Reactive defoaming additive | 1.0 |
| BYK 019 | Silicone defoamer | 0.5 |
| ViaCure-DX | UCB photoinitiator vehicle for ink applications | 6 |

In all the standard formulations, the pigments were initially ground in the ViaScreen vehicle, using a 3-roll mill. The pigment grind dispersions had a pigment loading of 20-55% depending on the pigment type. The dispersion was then let down with the rest of the formulation to get printable ink of suitable viscosity; preferably from about 800 to about 2500 cp.

Examples 1 to 4, formulations 1A through 4A, contain specific photoactive oligomers, of the present invention, as "drop in" replacements for the prior art oligomers detailed in Tables I-IV. Particular effort was made to replace only the oligomer and monomer portions of the benchmark formulations so that the formulations comprising the current invention could be better compared and contrasted with the standard. The composition of exemplars of oligomers of the present invention is defined in Table V.

TABLE V

Preferred Dispersion Resin Formulation.

| Resin Designation | Raw Materials | Weight (phr) | Viscosity (Poise @ 25° C.) |
| --- | --- | --- | --- |
| Ashland D-30R | TMPEOTA | 37.7 | 10.85 |
| | DPGDA | 21.3 | |
| | Ebecryl 81 amine-modified polyester acrylate | 26.4 | |
| | EAA | 12.0 | |

("phr": parts per hundred resin).

The screen inks of the present invention comprise an inventive resin-based, pigment dispersion; an inventive let-down resin; and a set of accessory components. A preferred pigment dispersion is based on the Michael dispersion resins of the present invention.

Michael dispersion resin. A Michael polyacrylate resin is equivalently termed a Michael oligomer, a Michael adduct, or a Michael addition product. A preferred Michael dispersion resin, Ashland D-30R was synthesized as follows: ethoxylated trimethylolpropane triacrylate (TMPEOTA, 75.4 g), dipropylene glycol diacrylate (DPGDA, 42.6 g), Ebecryl® 81 (52.8 g), ethyl acetoacetate (EAA, 24 g), glycidyl methacrylate (4.0 g), and tetrabutylammonium bromide (1.0 g) were weighed into a 500 ml, 3-neck round bottom flask equipped with a mechanical stirrer and condenser. The solution was heated to 95° Celsius and held at that temperature until an appropriate viscosity, corresponding to 100% disubstitution of the Michael donor, was achieved. After 2.5 h, a viscous yellow liquid having a cone and plate viscosity of 1085 cp was obtained. The yellow liquid did not gel upon standing.

Figure 2:
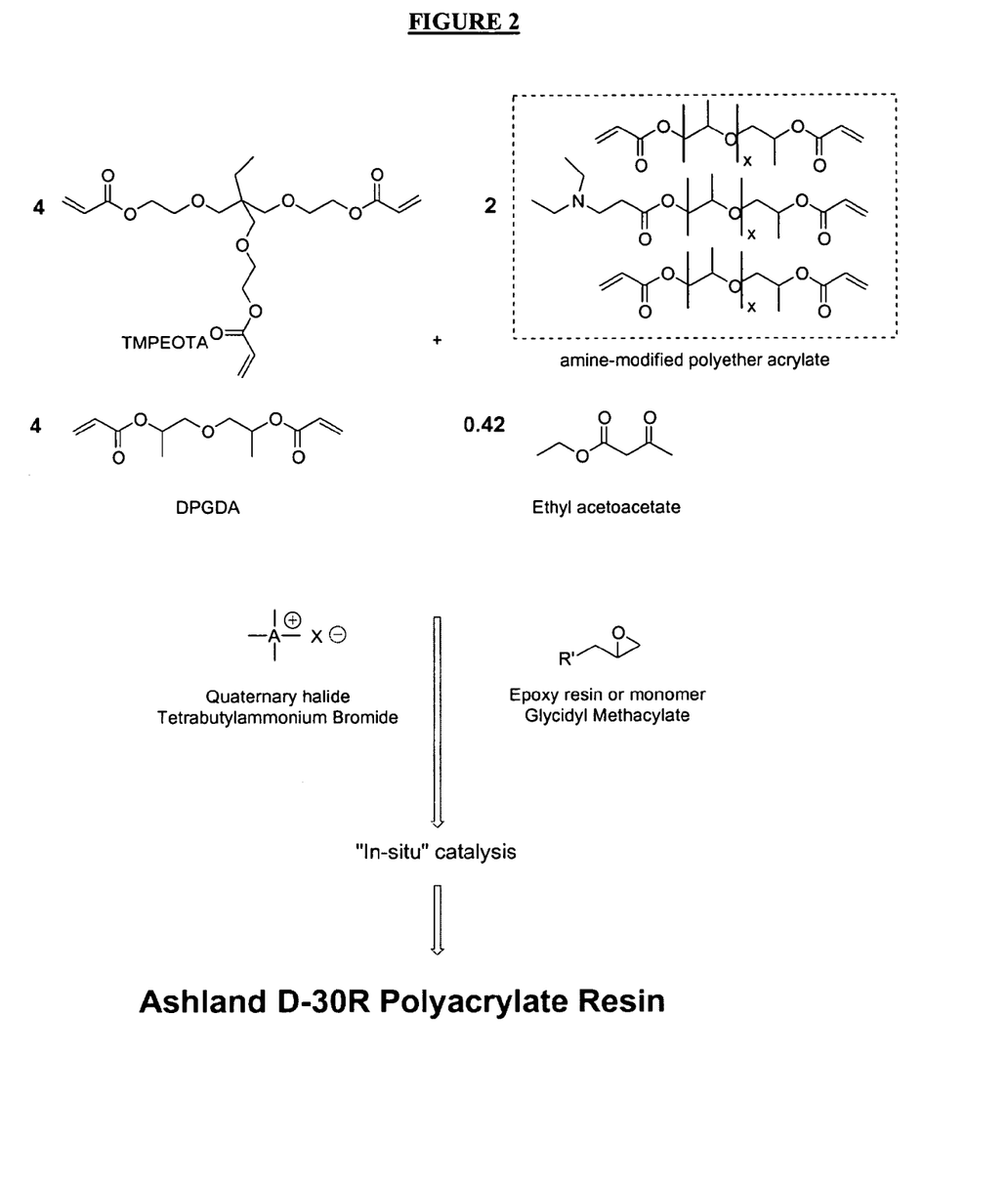
FIG. 2 is a schematic of the synthesis of Ashland D-30R.

The Michael addition reaction is catalyzed by a strong base. A preferred base is diazabicycloundecene (DBU), which is sufficiently strong and is readily soluble in the monomer mixtures. Other cyclic amidines, for example diazabicyclononene (DBN) and guanidines, for example 1,1,3,3-tetramethyl guanidine, are also suitable for catalyzing this addition reaction. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. The synthesis of resin D-30R is presented schematically in FIG. 2 which shows that strong, organophilic alkoxide bases can be generated in situ from the reaction between a halide anion (e.g., quaternary halide such as tetrabutylammonium bromide) and an epoxide moiety such as glycidyl methacrylate. Such in situ catalysts are disclosed in pending application Ser. No. 10/255,541 assigned to Ashland, Inc., the assignee of the present application. The entire contents of Ser. No. 10/255,541 are hereby incorporated by reference for all purposes.

Michael acceptors used to synthesize Michael dispersion resins include polyester acrylates, epoxy acrylates, urethane acrylates, acrylic monomers, amine-modified acrylates and mixtures thereof. Moreover, the molar ratio of the various acceptors may suitably range from 2.0 to 8.0.

A portion of the multifunctional acrylate Michael acceptor used to synthesize the oligomer of the dispersion is provided in the form of an amine-modified polyether or polyester acrylate, heretofore described simply as "polyacrylate". The molar ratio of the amine-modified polyacrylate may vary from about 0 to about 30. A preferred amine-modified polyether acrylate has functionality (number of acrylic double bonds) of 2.5, but may suitably have a functionality of 2-5. A preferred amine-modified polyacrylate has a color value of about 2 Gardner color units, but may have higher. A preferred amine-modified polyacrylate has a Hoppler viscosity of about 100 mPas. A preferred amine-modified polyether acrylate has a molecular weight of about 600. A preferred amine-modified polyether acrylate is Ebecryl® 81 (UCB Chemicals). Non-limiting examples of suitable amine-modified polyether acrylates include similar compounds obtained from other companies like Genomer 3364 or Genomer 3439 from Rahn chemicals, Actilane series resins from Akzo Nobel Resins and Laromer series resins from BASF Corporation.

Another means to create specific amino-modified polyacrylates is to admix primary and/or secondary amines with a blend of acrylate monomers in a "pseudo Michael Addition reaction" wherein the amines form covalent bonds with acrylic unsaturation in a one-to-one addition. Preferred amines include alkyl, cycloalkyl and alkanol amines, and dialkyl or dialkanol amines. Non-limiting examples of specific preferred amines include ethanolamine, isopropanolamine, cyclohexylamine, butlyamine, hexylamine, laurylamine, piperidine, substituted piperidines, morpholine, diethanolamine, diisopropylamine, and/or dibutylamine.

The β-dicarbonyl Michael donor used to synthesize Michael dispersion resins preferentially comprises ethyl acetoacetate (EAA). EAA is preferentially present in a 0.42 molar ratio compared to moles of total acceptor. Non-limiting examples of suitable β-dicarbonyl donors include ethyl acetoacetate, methyl acetoacetate, 2-ethylhexyl acetoacetate, lauryl acetoacetate, t-butyl acetoacetate, acetoacetanilide, N-alkyl acetoacetamide, acetoacetamide, 2-acetoacetoxyethyl acrylate, 2-acetoacetoxyethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate, 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylol propane triacetoacetate, polycaprolactone triacetoacetates, pentaerythritol tetraacetoacetate, and mixtures thereof. Moreover, the molar ratio of donor to acceptor may vary from about 0.125 to about 0.5.

A preferred Michael screen let-down resin, Ashland S-102R, was synthesized by a procedure similar to that use to obtain oligomer Ashland D-30R. A mixture comprising 57.2 g TMPEOTA, 15.4 g phenoxyethyl acetate (PEA), 77.6 g DPGDA, 27.4 g acetoacetanilide (AAA), 13.90 g dodecyl acetoacetate (DDAA), glycidyl methacrylate (4.0 g), and tetrabutyl ammonium bromide (1.0 g) was placed into a 500 ml 3-neck round bottom flask equipped with a mechanical stirrer and condenser. The solution was heated to 95° Celsius and held at that temperature until an appropriate viscosity, corresponding to 100% disubstitution of the Michael donor, was achieved. After 4 h, the reaction was cooled down and 3.6 g piperidine was added to cap a portion of the pendant acrylate groups. The final product was a viscous yellow liquid with a cone and plate viscosity of 2460 cp that did not gel upon standing.

TABLE VI

Preferred Screen Let-Down Resin Formulation.

| Resin Designation | Raw Materials | Weight (phr) | Viscosity (Poise @ 25° C.) |
|---|---|---|---|
| Ashland S-102R | TMPEOTA | 28.6 | 24.60 |
| | PEA | 7.7 | |
| | DPGDA | 38.8 | |
| | AAA | 13.7 | |
| | DDAA | 6.95 | |
| | piperidine | 1.8 | |

Industry standard pigments were chosen to compare the UV-cure resins of the present invention against conventional UV-cure resins. The chosen white pigment was Titanium Dioxide White DuPont R-706. The yellow pigment chosen was Pigment Yellow 14 YE 1400 DC (diarylide yellow, Magruder Color Company). The chosen blue pigment was Pigment Blue 15:3 BL-1531 (phthalocyanine blue, Magruder Color Company). The chosen red pigment was Pigment Red 57:1 LR-1392 (metallized azo red, Magruder Color Company). The various pigments were chosen as being standard to the industry. The present invention is not limited to the recited pigments. Persons of skill in the industry may readily determine other suitable pigments.

EXAMPLE 1

White UV-Curing Screen-Printing Ink

Michael resin pigment-dispersion 30-w-051903-05. A white pigment was ground in a dispersion resin using a 3-roll mill. A preferred embodiment utilizes oligomer Ashland D-30R as the dispersion resin. Other Michael dispersion resins may suitably be used for inks of the present invention. A preferred Michael resin-pigment dispersion (grind formulation) for white ink comprises 45 parts by weight of Michael oligomer Ashland D-30R and 105 parts of DuPont R-706 white pigment. The resin may suitably comprise, on a weight basis, from about 10 parts to about 75 parts. The pigment may suitably comprise, on a weight basis, from about 10 parts to about 90 parts. Michael dispersion resins and pigment dispersions are disclosed in co-pending application Ser. No. (number not yet assigned; Attorney Docket Number 20435/0151) the entire contents of which is hereby incorporated for all purposes.

Non-limiting examples of suitable whit pigments include titanium dioxide, zinc oxide, and barium sulfate.

The dispersions can be "reduced" or diluted with suitable screen let-down resins of the present invention and additives to give the desired ink formulation (screen). An advantage accrues from having the dispersion resin differ from the let-down resin because let-down resins can incorporate adhesion and other performance enhancing properties. Formulation viscosity are measured and deemed acceptable so long as the viscosity is within 10% of the viscosity of the standard white ink formulation. The ink is screen-printed onto various substrates. Curing is affected with a 600 W/in Fusion "H" bulb at the doses specified.

Screen-w-052703-02: A preferred embodiment of white, UV-curing ink, Screen-w-052703-02, comprises, on a weight basis, 57.8 parts of pigment dispersion 30-w-051903-05 (Inclusion of the pigment dispersion yields in the final ink formulation, 17.34 parts of Ashland D-30R dispersion resin and 40.46 parts pigment.); 29.1 parts of Ashland S-102R screen let-down resin; 10 parts of N-vinyl caprolactam, an adhesion promoting monomer; 1.0 part L-37® (L-37 is a proprietary, modified polyacrylate from Estron Chemicals), a reactive defoaming additive; 0.5 parts of BYK 019®, a silicone defoamer; and 2 parts ViaCure-LX® (UCB Chemicals), a photoinitiator vehicle for light-colored inks.

A white screen ink may suitably comprise, on a parts by weight basis, from about 30 parts to about 80 parts of a white pigment; from about 20 parts to about 80 parts of a Michael dispersion resin; from about 20 parts to about 75 parts of a Michael screen let-down resin; from about 0 parts to about 30 parts of a reactive diluent monomer; from about 0 parts to about 10 parts of a adhesion promoting monomer; from about 0 parts to about 3 parts of a reactive defoamer; from about 0 parts to about 1 parts of a silicone defoamer; and from about 0 parts to about 10 parts of a photo-initiator.

The white inks of the present invention suitably may comprise a Michael resin—pigment dispersion in an amount of from about 20 parts to about 80 parts.

Michael screen "let-down" resin. The present invention may suitably be let-down with from about 20 parts to about 75 parts of a Michael resin. A preferred screen let-down resin is Ashland S-102R. The acceptor used to synthesize the Michael let-down resin preferably comprises a mixture of TMPEOTA, PEA, and DPGDA in a molar ratio of 0.25/0.15/0.60. Non-limiting examples of suitable acrylate acceptors for a let-down resin include polyester acrylates, epoxy acrylates, urethane acrylates, acrylic monomers, amine-modified polyether acrylates, and mixtures thereof.

The β-dicarbonyl donor of the let-down resin preferentially comprises a mixture of acetoacetanilide and dodecyl acetoacetate in a 0.75/0.25 molar ratio. Non-limiting donors of the let-down resin may suitably comprise ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxyethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate, 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylol propane triacetoacetate, polycaprolactone triacetoacetates, pentaerythritol tetraacetoacetate, and mixtures thereof. The molar ratio of the various β-dicarbonyl donors may suitably vary from about 0.125 to about 0.5.

The let-down resin is further synthesized from an amine. Piperidine is a preferred amine and is preferably present at about 1.8% weight ratio. Non-limiting amines suitably include primary and secondary amines and especially diethanol amine, and morpholine. The weight ratio of the various amines may suitably vary from about 0 to about 10.

As measured at 300 rpm in a Brookfield® viscometer, a screen let-down resin preferably has a cone and plate viscosity of about 2460 cps at 25° C.

Adhesion promoting monomer. The inventive screen ink may comprise from about 0 parts to about 10 parts of an adhesion promoting monomer. A preferred monomer is N-vinyl caprolactam. Non-limiting suitable monomers may be chosen from N-vinyl pyrrolidone, vinyl ether esters, phenoxy ethyl acrylate, and others.

Reactive defoaming additive. A reactive additive is one, such as an acrylated moiety, which, upon curing, becomes part of cross-linked network. The screen inks of the present invention may comprise from about 0 parts to about 3 parts of a reactive defoaming additive. A preferred additive is L-37®, a modified polyacrylate (Estron Chemicals). Persons of skill in the art will be familiar with suitable reactive defoaming additives.

Silicone defoamer. The screen inks of the present invention may comprise from about 0 parts to about 1 part of a silicone defoamer. Silicone defoamers may suitably be silicones or siloxane copolymers. A preferred silicone defoaming additive is BYK 019® (BYK Chimie). Persons of skill in the art will be familiar with suitable silicone defoaming additives.

Photoinitiator for a light ink. The screen inks of the present invention may comprise from about 0 parts to about 10 parts of a photo-initiator additive. A preferred additive for light-colored inks is ViaCure® LX. Suitable non-limiting photo-initiators for light-colored inks include Irgacure 819 or other acyl phosphine oxide based photo-initiators (PI), Irgacure 184, Darocure 1173, and mixtures thereof.

EXAMPLE 2

Yellow UV-Curing Screen-Printing Ink

Dispersion 30-y-051903-02. A Michael resin-pigment dispersion was formed as above for white ink. A preferred pigment, YE1400DC was ground in Ashland D-30R resin using a 3-roll mill. A preferred weight ratio is 102 parts resin and 48 parts pigment. For a yellow ink the proportion of resin may vary from about 30 parts to about 80 parts. The proportion of pigment may vary from about 20 parts to about 50 parts. As described above, Ashland D-30R is a preferred dispersion resin, but other Michael dispersion resin formulations are suitable.

Yellow ink Screen-y-052703-01. The dispersion can be reduced or diluted with suitable screen let-down resins of the present invention and additives to give the desired ink formulation. Formulation viscosity was measured and deemed acceptable as long as it matched the standard yellow ink formulation within a tolerance of 10%. The ink was screen-printed onto various substrates. Curing was affected with a 600 W/in Fusion "H" bulb at the doses specified.

A preferred yellow ink formulation, (Screen-y-052703-01), comprises, on a parts by weight basis: 12.5 parts dispersion 30-y-051903-02, 73.5 parts Ashland S-102R, 10 parts of N-vinyl caprolactam, 1.0 part L-37®, 0.5 parts of BYK 019®, and 2.5 parts ViaCure-DX® (UCB Chemicals), a photoinitiator vehicle for inks.

For yellow inks, the proportion of dispersion may vary from about 10 parts to about 50 parts. The composition of the dispersion oligomer may vary as given above for white inks. The proportion of the let-down resin may vary from about 20 parts to about 80 parts. The composition of the let-down resin may vary as given above for white inks. Proportions of the remaining components may also vary as given above for white inks.

EXAMPLE 3

Red UV-Curing Screen-Printing Ink

Dispersion 30-R-051903-04. A preferred dispersion for red ink was formed by grinding a red pigment, LR-1392 with Ashland D-30R dispersion resin using a 3-roll mill. A preferred dispersion, 30-R-O51903-04, comprises, on a parts by weight basis: 97.5 parts resin 6923-30, 7.5 parts TMPEOTA as a diluent monomer, and 48 parts red pigment LR-1392. Suitably, a dispersion for a red ink may comprise from about 20 parts to about 75 parts of a dispersion resin, from about 0 parts to about 10 parts of a diluent monomer, and from about 20 parts to about 50 parts of a red pigment.

The composition of the dispersion resin may vary as indicated above. Non-limiting examples of suitable diluent monomers include ethylene glycol diacrylate, propylene glycol diacrylate, diethylene glycol diacrylate, dipropylene glycol diacrylate (DPGDA), triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, and mixtures thereof, glycerol triacrylate, ethoxylated trimethylolpropane triacrylate (TMPEOTA), propoxylated trimethylolpropane triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, polyester tetraacrylates, and mixtures thereof.

The dispersion was let-down with suitable resins of the present invention and additives to give a desired ink formulation. Formulation viscosity was measured and deemed acceptable as long as it matched the standard red ink formulation within a tolerance of 10%. The ink was screen-printed onto various substrates. Curing was affected with a 600 W/in Fusion "H" bulb at the doses specified.

Red ink formulation Screen-R-052702-03. A preferred red ink formulation, Screen-R-O52702-03, comprises, on a parts by weight basis: 16.75 parts red pigment dispersion 30-R-O51903-04, 68.25 parts Ashland S-102R let-down resin, 10 parts of N-vinyl caprolactam, 1.0 part L-37®, 0.5 parts of BYK 019®, and 3.5 parts ViaCure-DX® (UCB Chemicals).

For red inks, the proportion of dispersion may vary from about 10 parts to about 50 parts. The composition of the dispersion oligomer may vary as given above for white inks. The proportion of the let-down resin may vary from about 20 parts to about 80 parts. The composition of the let-down resin may vary as given above for white inks. The proportion of the remaining components may also vary as given above for white inks.

EXAMPLE 4

Blue UV-Curing Screen-Ink Formulations

Dispersion 30-b-O51903-01. A blue pigment was ground in an Ashland self-initiating dispersion resin using a 3-roll mill. A preferred blue pigment, BL-1531 was ground in Ashland D-30R resin. A preferred weight ratio is 105 parts resin and 45 parts pigment. For blue inks the proportion of resin may vary from about 20 parts to about 80 parts. The proportion of pigment may vary from about 20 parts to about 50 parts. As described above, Ashland D-30R is a preferred dispersion resin, but other Michael resin formulations are suitable.

The dispersion was let-down with suitable resins and additives to give a desired ink formulation (Screen-b-05200 1-04). Formulation viscosity was measured and deemed acceptable as long as it matched the standard blue ink formulation within a tolerance of 10%. The ink was screen-printed onto various substrates. Curing was affected with a 600 W/in Fusion "H" bulb at the doses specified.

Blue ink formulation Screen-b-052001-04. A preferred blue ink formulation, Screen-b-052001-04, comprises, on a parts by weight basis: 13.4 parts blue pigment dispersion 30-b-051903-01, 71.6 parts Ashland S-102R let-down resin, 10 parts of N-vinyl caprolactam, 1.0 part L-37®, 0.5 parts of BYK 019®, and 3.5 parts ViaCure-DX® (UCB Chemicals).

For blue inks, the proportion of dispersion may vary from about 10 parts to about 50 parts. The composition of the dispersion oligomer may vary as given above for white inks. The proportion of the let-down resin may vary from about 20 parts to about 80 parts. The composition of the let-down resin may vary as given above for white inks. The proportion of the remaining components may also vary as given above for white inks.

TABLE VII

Comparative evaluation of Screen-ink Formulations.

| Formulation | % pigment | % PI | Viscosity @ 25° C. (cp.) | Dosage for tack-free cure (mJ/cm$^2$) | Gloss (60°) | Adhesion (coated paper) |
|---|---|---|---|---|---|---|
| Screen-w-052703-05 | 40 | 2.0 | 969 | <300 | 89.6 | 5B |
| Screen UCB-w-052803-05 | 40 | 6.0 | 1020 | <300 | 90.9 | 5B |
| Screen-y-052703-01 | 4 | 2.5 | 1071 | <300 | 95.1 | 5B |
| Screen UCB-y-052803-04 | 4 | 4.0 | 1002 | <300 | 92.8 | 5B |

TABLE VII-continued

Comparative evaluation of Screen-ink Formulations.

| Formulation | % pigment | % PI | Viscosity @ 25° C. (cp.) | Dosage for tack-free cure (mJ/cm²) | Gloss (60°) | Adhesion (coated paper) |
|---|---|---|---|---|---|---|
| Screen-r-052703-03 | 5 | 3.5 | 1017 | <300 | 93.0 | 5B |
| Screen UCB-R-052803-01 | 5 | 5.0 | 950 | <300 | 88.0 | 5B |
| Screen-b-652063-64 | 4 | 3.5 | 999 | <300 | 89.7 | 5B |
| Screen UCB-b-052003-05 | 4 | 6.0 | 969 | <300 | 35.3 | 5B |

The examples listed in the above table compare and contrast the performance of the various color screen-printing inks formulated with self-initiating resins of the present invention and commercial UCB vehicle expressly sold for screen ink formulation purposes. For valid comparisons, the inks were formulated to have matching viscosities within a 10% tolerance. An obvious advantage of ink formulations, based on the resins of the present invention, over the commercial standards is the much lower photo-initiator requirement of the former to achieve comparable gloss and adhesion levels. This advantage translates into significant cost savings as well as providing handling benefits from using less of the traditional photoinitiators which can be toxic and/or malodorous. In addition, traditional photoinitiators can contribute to film color, which can limit applicability in white and light-colored inks. Respecting blue, yellow, and red ink formulations, a performance advantage is also realized as the gloss performance of the inks of the present invention are much better than commercial benchmarks at much lower levels of photo-initiator.

Let-Down Resins and Inks for Flexographic Printing Applications.

Benchmark formulations based on commercially available resins were chosen as comparative standards. The formulations are comprised of commercial raw materials, in parts by weight, as specified in Tables VIII-XI. ViaFlex™ vehicles are a mixture of monomers and oligomers optimized for ink applications. ViaCure™ vehicles are a mixture of photoinitiators optimized for the various colored ink formulations.

TABLE VIII

Standard White Flexo-Ink Formulation (Flexo-UCB-w-061003-01)

| Raw Material | Description | Parts (w/w) |
|---|---|---|
| Pigment | R-706 | 40.0 |
| ViaFlex 165 | UCB vehicle for grinding pigments for flexo inks | 27.5 |
| ViaFlex 405 | UCB vehicle for let-down of flexo inks | 26.0 |
| LG-37 | Reactive defoaming additive | 1.0 |
| BYK 019 | Silicone defoamer | 0.5 |
| ViaCure LX | UCB photoinitiator vehicle for ink applications | 5 |

TABLE IX

Standard Yellow Flexo-Ink Formulation (Flexo-UCB-y-061203-02)

| Raw Material | Description | Parts (w/w) |
|---|---|---|
| Pigment | YE 1400 DC | 9.0 |
| ViaFlex 165 | UCB vehicle for grinding pigments for flexo inks | 19.1 |
| ViaFlex 405 | UCB vehicle for let-down of flexo inks | 45.0 |
| CN 115 | Epoxy acrylate | 20.4 |
| LG-37 | Reactive defoaming additive | 1.0 |
| BYK 019 | Silicone defoamer | 0.5 |
| ViaCure-DX | UCB photoinitiator vehicle for ink applications | 5.0 |

TABLE X

Standard Red Flexo-Ink Formulation (Flexo-UCB-R-061103-01)

| Raw Material | Description | Parts (w/w) |
|---|---|---|
| Pigment | LR-1392 | 9.0 |
| ViaFlex 165 | UCB vehicle for grinding pigments for flexo inks | 21.0 |
| ViaFlex 405 | UCB vehicle for let-down of flexo inks | 45.0 |
| CN 115 | Epoxy acrylate | 19.0 |
| LG-37 | Reactive defoaming additive | 1.0 |
| BYK 019 | Silicone defoamer | 0.5 |
| ViaCure-DX | UCB photoinitiator vehicle for ink applications | 4.5 |

TABLE XI

Standard Blue Flexo-Ink Formulation (Flexo-UCB-b-061203-04)

| Raw Material | Description | Parts (w/w) |
|---|---|---|
| Pigment | BL-1531 | 9.0 |
| ViaFlex 165 | UCB vehicle for grinding pigments for flexo inks | 19.1 |
| ViaFlex 405 | UCB vehicle for let-down of flexo inks | 47.5 |
| CN 115 | Epoxy acrylate | 16.9 |
| LG-37 | Reactive defoaming additive | 1.0 |
| BYK 019 | Silicone defoamer | 0.5 |
| ViaCure-DX | UCB photoinitiator vehicle for ink applications | 6.0 |

Pigment dispersions for the benchmark inks were formed by grinding pigments in a ViaFlex™ 165 vehicle, using a 3-roll mill. Depending on pigment type, the dispersions had a pigment loading of 30-60%.

Benchmark inks were fabricated by "letting-down" a conventional pigment dispersion in a conventional flexo let-down resin (ViaFlex 405 and accessory components to get printable inks of suitable viscosity.

Examples 5-8, set forth formulations of flexographic inks of the present invention containing specific photo-active oligomers of the present invention as "drop in" replacements for the prior art oligomers detailed in Tables VIII to XI. Particular effort was made to replace only the oligomer and monomer portions of the benchmark formulations so that the formulations comprising the current invention could be better compared and contrasted with the standard. A preferred dispersion resin is defined in Table V above. Preferred flexo let-down resins are defined in Table XII.

TABLE XII

Preferred Flexo Let-Down Resin Compositions.

| Resin Designation | Raw Materials | Molar Ratio | Viscosity (Poise @ 25° C.) |
|---|---|---|---|
| Ashland F-126R | TMPEOTA | 0.15 | 4.30 |
| | DPGDA | 0.85 | |
| | 2-Methoxyethyl acetoacetate | 0.33 | |
| | piperidine | 0.60 (wt %) | |
| Ashland F-131R | TMPEOTA | 0.15 | 5.08 |
| | DPGDA | 0.85 | |
| | 2-Methoxyethyl acetoacetate | 0.36 | |
| | piperidine | 0.40 (wt %) | |
| Ashland F-33R | HDDA | 0.85 | 6.80 |
| | CN-116 | 0.10 | |
| | TMPTA | 0.05 | |
| | EAA | 0.38 | |
| | piperidine | 0.2 (wt. %) | |
| Ashland F128R | 0.90 HDDA | 0.90 | 4.61 |
| | MDI-DA | 0.10 | |
| | EAA | 0.33 | |
| | piperidine | 0.6 (wt. %) | |

Pigment dispersions for flexographic inks were prepared as disclosed in co-pending application Ser. No. (number not yet assigned; Attorney Docket Number 20435/0151) the entire contents of which is hereby incorporated for all purposes. A preferred pigment dispersion is based on resin Ashland D-30R as disclosed above for screen inks.

Flexographic let-down resins were prepared as disclosed above for screen let-down resins and as disclosed in co-pending application Ser. No. (number not yet assigned; Attorney Docket Number 20435/0151) the entire contents of which is hereby incorporated for all purposes. Composition of preferred flexo let-down resins are set forth in Table XII.

The dispersions are let-down with suitable flexo let-down resins of the present invention and additives to give the desired ink formulation. Formulation viscosity are measured and deemed acceptable so long as the viscosity is within 10% of the viscosity of the standard white ink formulation. The ink is screen-printed onto various substrates. Curing is affected with a 600 W/in Fusion "H" bulb at the doses specified.

EXAMPLE 5

White Flexo Ink

TABLE XIII

Dispersion 30-w-051903-05

| Component | Description | Amount |
|---|---|---|
| Ashland D-30R | Resin vehicle | 45.0 |
| R-706 | White pigment (Dupont) | 105.00 |

TABLE XIV

Preferred White Flexo Ink Formulation.

| Raw Material | Description | Parts (w/w) |
|---|---|---|
| Pigment | R-706 | 40.0 |
| Ashland D-30R | Ashland resin for grinding pigments | 17.5 |
| Ashland F-126R | Ashland resin | 28.0 |
| N-vinyl Caprolactam | Adhesion promoting monomer | 10.0 |
| L-37 | Reactive defoaming additive | 1.0 |
| BYK 019 | Silicone defoamer | 0.5 |
| ViaCure-LX | UCB photoinitiator vehicle for light ink applications | 3.0 |

Flexo-w-060403-02. A preferred embodiment of white, UV-curing flexo ink, Flexo-w-060403-02, comprises, on a weight basis, 57.5 parts of pigment dispersion 30-w-051903-05 (inclusion of the pigment dispersion yields in the final ink formulation, 17.5 parts of Ashland D-30R dispersion resin and 40.0 parts pigment); 28.0 parts of Ashland F-126R flexo let-down resin, 10 parts of N-vinyl caprolactam, 1.0 part L-37® (Estron Chemicals), 0.5 parts of BYK 019®, and 3 parts ViaCure-LX® (UCB Chemicals.

A white flexographic ink may suitably comprise, on a parts by weight basis, from about 30 parts to about 60 parts of a white pigment; from about 10 parts to about 40 parts of a Michael dispersion resin; from about 20 parts to about 60 parts of a Michael flexo let-down resin; up to about 30 parts of a reactive diluent monomer; up to about 10 parts of a adhesion promoting monomer; up to about 3 parts of a reactive defoamer; up to about 1 part of a silicone defoamer; and up to about 10 parts of a photo-initiator.

The white flexo inks of the present invention suitably may comprise a Michael resin-pigment dispersion in an amount of from about 8 parts to about 30 parts.

Michael flexo let-down resin. The present invention may suitably be let-down with from about 10 parts to about 80 parts of a Michael flexo let-down resin. A preferred flexo let-down resin is Ashland F-126R. The acceptor use to synthesize the Michael flexo let-down resin preferably comprises a mixture of TMPEOTA, and DPGDA in a molar ratio of 0.15/0.85. Non-limiting examples of suitable acrylate acceptors for a flexo let-down resin include polyester acrylates, epoxy acrylates, urethane acrylates, acrylic monomers, amine-modified polyether acrylates, and mixtures thereof.

The β-dicarbonyl donor of flexo let-down resins preferentially comprises a mixture of β-keto esters and β-diketones. Non-limiting examples of suitable donors for flexo let-down resins include ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxylethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate, 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylol propane triacetoacetate, polycaprolactone triacetoacetates, pentaerythritol tetraacetoacetate, and mixtures thereof. The molar ratio of the β-dicarbonyl donor to total acceptor, may suitably vary from about 0.125 to about 0.5.

Flexo let-down resins are further synthesized from an amine. Piperidine is a preferred amine and is preferably present at about a 1.2% weight ratio. Non-limiting amines suitably include those recited above for screen let-down resins. The weight ratio of the various amines may suitably vary from about 0 to about 10.

As measured at 300 rpm in a Brookfield® viscometer, a flexo let-down resin preferably has a plate and cone viscosity of about 500 cps at 25° C. Preferably let-down resins for flexo inks are of much lower viscosity than the dispersion resins so that no reactive diluent monomer has to be used. A suitable range of viscosity is from about 100 cp to about 800 cp.

Adhesion promoting monomer. The inventive flexo ink may comprise up to about 10 parts of an adhesion promoting monomer. A preferred monomer is N-vinyl caprolactam. Non-limiting suitable monomers include N-vinyl pyrrolidone, vinyl ether esters, and phenoxy ethyl acrylate.

Reactive defoaming additive. The flexo inks of the present invention may comprise from about 0.1 parts to about 5 parts of a reactive defoaming additive. A preferred additive is L-37® (Estron Chemical). Persons of skill in the art will understand how to determine a suitable additive.

Silicone defoamer. The flexo inks of the present invention may comprise from about 0.1 parts to about 3 parts of a silicone defoamer. A preferred silicone defoaming additive is BYK® 019, a silicone based proprietary defoamer (Byk Chemie). Persons of skill in the art will understand how to determine a suitable additive.

Photoinitiator for a light ink. The flexo inks of the present invention may comprise up to about 10 parts of a photoinitiator (PI) additive. A preferred additive for light-colored inks is ViaCure® LX. Non-limiting suitable photo-initiators for light-colored inks include Irgacure 819 or other acyl phosphine oxide based PI, Irgacure 184, Darocure 1173, and mixtures thereof.

EXAMPLE 6

Yellow UV-Curing Flexo-Printing Ink

TABLE XV

Dispersion 30-y-051903-02

| Component | Description | Amount |
|---|---|---|
| 6923-30 | Resin vehicle | 102.0 |
| YE 1400DC | Yellow pigment | 48.00 |

TABLE XVI

Preferred Yellow Flexo Ink Formulation.

| Raw Material | Description | Parts (w/w) |
|---|---|---|
| YE-1400DC | Pigment | 9.0 |
| Ashland D-30R | Ashland resin for grinding pigments | 19.1 |
| Ashland F-126R | Ashland self-initiating resin | 56.9 |
| N-vinyl Caprolactam | Adhesion promoting monomer | 10.0 |
| L-37 | Reactive defoaming additive | 1.0 |
| BYK 019 | Silicone defoamer | 0.5 |
| ViaCure-DX | UCB photoinitiator vehicle for ink applications | 3.5 |

Dispersion 30-y-051903-02. A Michael resin-pigment dispersion was formed as above for white ink. A preferred pigment, YE1400DC was ground in Ashland D-30R resin using a 3-roll mill. A preferred weight ratio is 102 parts resin and 48 parts pigment. For a yellow flexo ink the proportion of resin may vary from about 20 parts to about 70 parts. The proportion of pigment may vary from about 20 parts to about 50 parts. As described above, Ashland D-30R is a preferred dispersion resin, but other Michael resin formulations are suitable.

Yellow ink flexo-y-O52703-01. The dispersion let-down with suitable flexo let-down resins of the present invention and additives to give the desired ink formulation. Formulation viscosity was measured and deemed acceptable as long as it matched the standard yellow ink formulation within a tolerance of 10%. The ink was flexo-printed onto various substrates. Curing was affected with a 600 W/in Fusion "H" bulb at the doses specified.

A preferred yellow ink formulation, (Flexo-y-O52703-01), comprises, on a parts by weight basis: 28.1 parts dispersion 30-y-051903-02, 56.9 parts inventive resin Ashland F-126R, 10 parts of N-vinyl caprolactam, 1.0 part L-37®, 0.5 parts of BYK 019®, and 3.5 parts ViaCure-DX® (UCB Chemicals), a photoinitiator vehicle for inks. about 10 parts to about 50 parts of a dispersion resin, up to about 30 parts of a diluent monomer, and from about 20 parts to about 80 parts of a red pigment.

The composition of a flexo dispersion resin may vary as indicated above. Non-limiting examples of suitable diluent monomers include ethylene glycol diacrylate, propylene glycol diacrylate, diethylene glycol diacrylate, dipropylene glycol diacrylate (DPGDA), triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, and mixtures thereof, glycerol triacrylate, ethoxylated trimethylolpropane triacrylate (TMPEOTA), propoxylated trimethylolpropane triacrylate, ethoxylated glycerol triacrylate, propoxylated glycerol triacrylate, pentaerythritol triacrylate, melamine triacrylates, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, melamine tetraacrylates, and mixtures thereof.

The dispersion was let-down with suitable flexo let-down resins of the present invention and additives to give a desired ink formulation. Formulation viscosity was measured and deemed acceptable as long as it matched the standard red ink formulation within a tolerance of 10%. The ink was flexo-printed onto various substrates. Curing was affected with a 600 W/in Fusion "H" bulb at the doses specified.

Red ink formulation flexo-R-O52702-03. A preferred red flexo ink formulation, flexo-R-O52702-03, comprises, on a parts by weight basis: 28.1 parts dispersion 30-R-O51903-04, 56.9 parts flexo let-down resin Ashland F-131R, 10 parts of For yellow flexo inks, the proportion of dispersion may vary from about 10 parts to about 50 parts. The composition of the dispersion oligomer may vary as given above for white inks. The proportion of the let-down resin may vary from about 20 parts to about 80 parts. The composition of the let-down resin may vary as given above for white inks.

The proportion of the remaining components may also vary as given above for white inks.

EXAMPLE 7

Red UV-Curing Flexo-Printing Ink

TABLE XVII

Dispersion 30-R-051903-04

| Component | Description | Amount |
|---|---|---|
| Ashland D-30R | Resin vehicle | 97.5 |
| TMPEOTA | Diluent monomer | 7.5 |
| LR-1392 | Red pigment | 48.00 |

TABLE XVIII

Preferred Red Flexo Ink Formulation.

| Raw Material | Description | Parts (w/w) |
|---|---|---|
| LR-1392 | Pigment | 9.0 |
| Ashland D-30R | NovaCure resin for grinding pigments | 21.0 |
| Ashland F-131R | NovaCure resin | 55.5 |
| N-vinyl Caprolactam | Adhesion promoting monomer | 10.0 |
| LG-37 | Reactive defoaming additive | 1.0 |
| BYK 019 | Silicone defoamer | 0.5 |
| ViaCure-DX | UCB photoinitiator vehicle for ink applications | 3.0 |

Dispersion 30-R-051903-04. A preferred dispersion for red ink was formed by grinding a red pigment, LR-1392 with Ashland D-30R dispersion resin using a 3-roll mill. The preferred dispersion, 30-R-051903-04, comprises, on a parts by weight basis: 97.5 parts resin Ashland D-30R; 7.5 parts TMPEOTA, a diluent monomer; and 48 parts red pigment LR-1392. Suitably, a dispersion for a red flexo ink may comprise from N-vinyl caprolactam, 1.0 part L-37®, 0.5 parts of BYK 019®, and 3.5 parts ViaCure-DX® (UCB Chemicals).

For red flexo inks, the proportion of dispersion may vary from about 10 parts to about 50 parts. The composition of the dispersion oligomer may vary as given above for white inks. The proportion of the let-down resin may vary from about 20 parts to about 80 parts. The composition of the let-down resin may vary as given above for white inks. The proportion of the remaining components may also vary as given above for white inks.

EXAMPLE 8

Blue UV-Curing Flexo-Ink Formulations

TABLE XIX

Dispersion 30-b-032803-01

| Component | Description | Amount |
|---|---|---|
| Ashland D-30R | Resin vehicle | 105.0 |
| BL-1531 | Blue pigment | 45.00 |

TABLE XX

Preferred Blue Flexo Ink Formulation.

| Raw Material | Description | Parts (w/w) |
|---|---|---|
| BL-1531 | Pigment | 9.0 |
| Ashland D-30R | Ashland resin for grinding pigments | 21.0 |
| Ashland F-33R | Ashland self-initiating resin | 17.0 |
| Ashland F-128R | Ashland self-initiating resin | 17.0 |
| TMPEOTA | Reactive diluent | 23.0 |
| DPGDA | Reactive diluent | 6.5 |
| L-37 | Reactive defoaming additive | 1.0 |
| BYK 019 | Silicone defoamer | 0.5 |
| ViaCure-DX | UCB photoinitiator vehicle for ink applications | 5.0 |

Dispersion 30-b-O51903-01. A blue pigment was ground in a dispersion resin of the present invention using a 3-roll mill. A preferred blue pigment, BL-1531 was ground in Ashland D-30R resin a preferred flexo dispersion oligomer. A preferred weight ratio is 105 parts resin and 45 parts pigment. For blue inks the proportion of resin may vary from about 10 parts to about 50 parts. The proportion of pigment may vary from about 20 parts to about 50 parts. As described above, Ashland D-30 is a preferred dispersion resin, but other Michael resin formulations are suitable.

The dispersion was let-down with suitable flexo let-down resins of the present invention and additives to give a desired ink formulation (Screen-b-05200 1-04). Formulation viscosity was measured and deemed acceptable as long as it matched the standard blue ink formulation within a tolerance of 10%. The ink was flexo-printed onto various substrates. Curing was affected with a 600 W/in Fusion "H" bulb at the doses specified.

Blue ink formulation flexo-b-052001-04. A preferred blue ink formulation, flexo-b-052001-04, comprises, on a parts by weight basis: 30.0 parts blue pigment dispersion 30-b-051903-01, 17.0 parts Ashland F-133R flexo let-down resin, 17.0 parts Ashland F-128R flexo let-down resin, 23.0 parts of TMPEOTA, a reactive diluent, 6 parts of DPGDA, 1.0 part L-37®, 0.5 parts of BYK 019®, and 5.0 parts ViaCure-DX® (UCB Chemicals).

For blue flexo inks, the proportion of dispersion may vary from about 10 parts to about 50 parts. The composition of the dispersion oligomer may vary as given above for white inks. The proportion of the let-down resin may vary from about 20 parts to about 80 parts. The proportion of the remaining components may also vary as given above for white inks.

EXAMPLE 5

Comparative Evaluation of Flexographic Ink Formulations

| Formulation | % pigment | % PI | Viscosity @ 25° C. (cp.) | Dosage for tack-free cure (mJ/cm$^2$) | Gloss (60°) | Adhesion (coated paper) |
|---|---|---|---|---|---|---|
| Flexo-w-060403-02 | 40 | 3.0 | 444 | <300 | 75.3 | 5B |
| FlexoUCB-w-052803-05 | 40 | 5.0 | 495 | <300 | 53.0 | 5B |
| Flexo-y-061203-01 | 9 | 3.5 | 459 | <300 | 44.6 | 5B |

-continued

| Formulation | % pigment | % PI | Viscosity @ 25° C. (cp.) | Dosage for tack-free cure (mJ/cm$^2$) | Gloss (60°) | Adhesion (coated paper) |
|---|---|---|---|---|---|---|
| FlexoUCB-y-061203-02 | 9 | 5.0 | 513 | <300 | 57.1 | 5B |
| Flexo-R-061003-03 | 9 | 3.0 | 456 | <300 | 57.6 | 5B |
| FlexoUCB-R-061103-01 | 9 | 4.5 | 468 | <300 | 72.0 | 5B |
| Flexo-b-033103-01 | 9 | 5.0 | 459 | <300 | 38.8 | 5B |
| FlexoUCB-b-061203-04 | 9 | 6.0 | 474 | <300 | 43.3 | 5B |

Although the illustrative embodiments of the invention are drawn from flexographic and screen-printing arts, the invention is not intrinsically limited to those arts.

Furthermore, it is to be understood that the form of the invention shown and described is to be taken as presently preferred embodiments. Various modifications and changes may be made to each and every processing step as would be obvious to a person skilled in the art having the benefit of this disclosure. It is intended that the following claims be interpreted to embrace all such modifications and changes and, accordingly, the specification and drawings are to be regarded in an illustrative rather than a restrictive sense. Moreover, it is intended that the appended claims be construed to include alternative embodiments.

INCORPORATION BY REFERENCE

All publications, patents, patent applications, and ASTM test methods cited in this specification are herein incorporated by reference, and for any and all purposes, as if each individual publication, patent, patent application, or ASTM method were specifically and individually indicated to be incorporated by reference. In the case of inconsistencies the present disclosure will prevail. Most especially, the entire contents of U.S. Pat. Nos. 5,945,489 and 6,025,410; co-pending application Ser. No. 10/255,541, and co-pending applications Ser. Nos. (numbers not yet assigned; Attorney Docket Numbers 20435/0141, 20435/0144, 20435/0145, 20435/0146, 20435/0148, and 20435/0151) are herein incorporated by reference and for all purposes.

Having thus described our invention, what we claim as new, and desire to secure by Letters Patent is:

1. A Michael flexo let-down resin comprising: about 18.4 wt. % trimethyolpropane ethoxytriacrylate (TMPEOTA) about 59.0 wt. % dipropylene glycol diacrylate; about 4.9 wt. % piperidine; and about 15.3 wt. % methoxyethyl acetoacetate (MEAA).

2. A UV-curable, flexographic ink comprising: from about 10 parts, by weight, to about 80 parts, by weight, of a Michael flexo let-down resin and from about 10 parts, by weight, to about 50 parts, by weight, of a pigment dispersion, wherein the Michael flexo let-down resin comprises:
  a monomer or oligomer serving the function of pigment wetting;
  a monomer serving the function of viscosity control;
  a monomer serving the function of adhesion promotion;
  a monomer serving the function of cure enhancement selected from the group consisting of amine-modified polyether, polyester, epoxy or urethane acrylates, primary and secondary amines and amino acrylates; and
  a monomer serving the function of Michael donor providing a photolabile chromophore and wherein said pigment dispersion comprises a resin formed from a polyacrylate Michael acceptor and a dicarbonyl Michael donor and a pigment.

3. The UV-curable, flexographic ink, according to claim 2, further comprising up to about 10 parts by weight of an adhesion monomer.

4. The UV-curable, flexographic ink, according to claim 3, wherein said adhesion monomer is selected from the group consisting of N-vinyl caprolactam, N-vinyl pyrrolidone, and vinyl ether esters.

5. The UV-curable, flexographic ink, according to claim 4, wherein said adhesion monomer is N-vinyl caprolactam.

6. The UV-curable, flexographic ink, according to claim 2, further comprising up to about 5 parts by weight of a reactive defoamer.

7. The UV-curable, flexographic ink, according to claim 6, wherein said reactive defoamer is selected from the group consisting of an acrylated defoamer.

8. The UV-curable, flexographic ink, according to claim 2, further comprising up to about 1 part by weight of a silicone defoamer.

9. The UV-curable, flexographic ink, according to claim 8, wherein said silicone defoamer is selected from the group consisting of silicones and siloxane copolymers.

10. The UV-curable, flexographic ink, according to claim 2, further comprising up to about 10 parts by weight of a photoinitiator.

11. A method of using a UV-curable, flexographic ink, the method comprising: applying the UV-curable, flexographic ink of claim 2, to a substrate; and curing said ink.

12. The method of using a UV-curable, flexographic ink, according to claim 11, wherein said curing comprises irradiating said ink with an effective amount of actinic light.

13. The method of using a UV-curable, flexographic ink, according to claim 11, further comprising: providing a flexographic printing press; and applying said ink to said substrate using said press.

14. A printed substrate comprising a printable substrate having applied thereto the UV-curable, flexographic ink of claim 2.

15. The printed substrate, according to claim 14, wherein said ink is cured.

16. A Michael screen let-down resin for a screen-print ink, said Michael screen let-down resin comprising: a monomer serving the function of pigment wetting; a monomer serving the function of viscosity control; a monomer serving the function of adhesion promotion; a monomer serving the function of cure enhancement selected from the group consisting of amine-modified polyether, polyester, epoxy or urethane acrylates, primary and secondary amines, and amino acrylates; a monomer serving the function of Michael donor providing a photolabile chromophore, wherein the adhesion promotion monomer is phenoxyethyl acetate.

17. A Michael screen let-down resin for a screen-print ink, said Michael screen let-down resin comprising: a monomer serving the function of pigment wetting; a monomer serving the function of viscosity control; a monomer serving the function of adhesion promotion; a monomer serving the function of cure enhancement selected from the group consisting of amine-modified polyether, polyester, epoxy or urethane acrylates, primary and secondary amines and amino acrylates; a monomer serving the function of Michael donor providing a photolabile chromophore, an further comprising: about 28.6 wt. % trimethyolpropane ethoxytriacrylate (TMPEOTA) TMPEOTA; about 38.8 wt. %

DPGDA; about 7.7 wt. % phenoxyethyl acetate about 6.9% dodecyl acetoacetate; about 13.7 wt. % acetoacetanilide; and about 1.8 wt. % piperidine.

18. A UV-curable, screen ink comprising: from about 20 parts, by weight, to about 80 parts, by weight, of a Michael screen let-down resin; and from about 10 parts, by weight, to about 50 parts, by weight, of a pigment dispersion, wherein the Michael let-down resin comprises a monomer serving the function of pigment wetting; a monomer serving the function of viscosity control; a monomer serving the function of adhesion promotion; a monomer serving the function of cure enhancement selected from the group consisting of amine-modified polyether, polyester, epoxy or urethane acrylates, primary and secondary amines, and amino acrylates; a monomer serving the function of Michael donor providing a photolabile chromophore and wherein said pigment dispersion comprises a resin formed from a polyacrylate Michael acceptor and a dicarbonyl Michael donor and a pigment.

19. The UV-curable, screen ink, according to claim 18, further comprising up to about 10 parts by weight of an adhesion monomer.

20. The UV-curable, screen ink, according to claim 19, wherein said adhesion monomer is selected from the group consisting of N-vinyl caprolactam, N-vinyl pyrrolidone, and vinyl ether esters.

21. The UV-curable, screen ink, according to claim 20, wherein said adhesion monomer is N-vinyl caprolactam.

22. The UV-curable, screen ink, according to claim 18, further comprising up to about 5 part by weight of a reactive defoamer.

23. The UV-curable, screen ink, according to claim 22, wherein said reactive defoamer is a modified polyacrylate.

24. The UV-curable, screen ink, according to claim 18, further comprising up to about 1 part by weight of a silicone defoamer.

25. The UV-curable, screen ink, according to claim 24, wherein said silicone defoamer is selected from the group consisting of silicones and siloxane copolymers.

26. The UV-curable, screen ink, according to claim 18, further comprising up to about 10 parts by weight of a photoinitiator.

27. A method of using a UV-curable, screen ink, the method comprising: applying the UV-curable, screen ink of claim 18, to a substrate; and curing said ink.

28. The method of using a UV-curable, screen ink, according to claim 27, wherein curing comprises irradiating said ink with an effective amount of actinic light.

29. The method of using a UV-curable, screen ink, according to claim 27, further comprising: providing a screen printing press; and applying said ink to said substrate using said press.

30. A printed substrate comprising a printable substrate having applied thereto the UV-curable, screen ink, according to claim 18.

31. The printed substrate, according to claim 30, wherein said ink is cured.

32. A writing instrument or printer having the UV-curable, screen ink of claim 18, stored therein.

33. A writing instrument or printer having the UV-curable, flexo ink of claim 2, stored therein.

34. A writing instrument or printer having the Michael flexo let-down resin of claim 1, stored therein.

35. A writing instrument or printer having the Michael screen let-down resin of claim 16, stored therein.

36. A writing instrument or printer having the Michael screen let-down resin of claim 17, stored therein.

* * * * *